April 26, 1927.  
F. W. SEECK  
DIFFERENTIAL  
1,626,120  
Original Filed Sept. 18, 1923  3 Sheets-Sheet 1
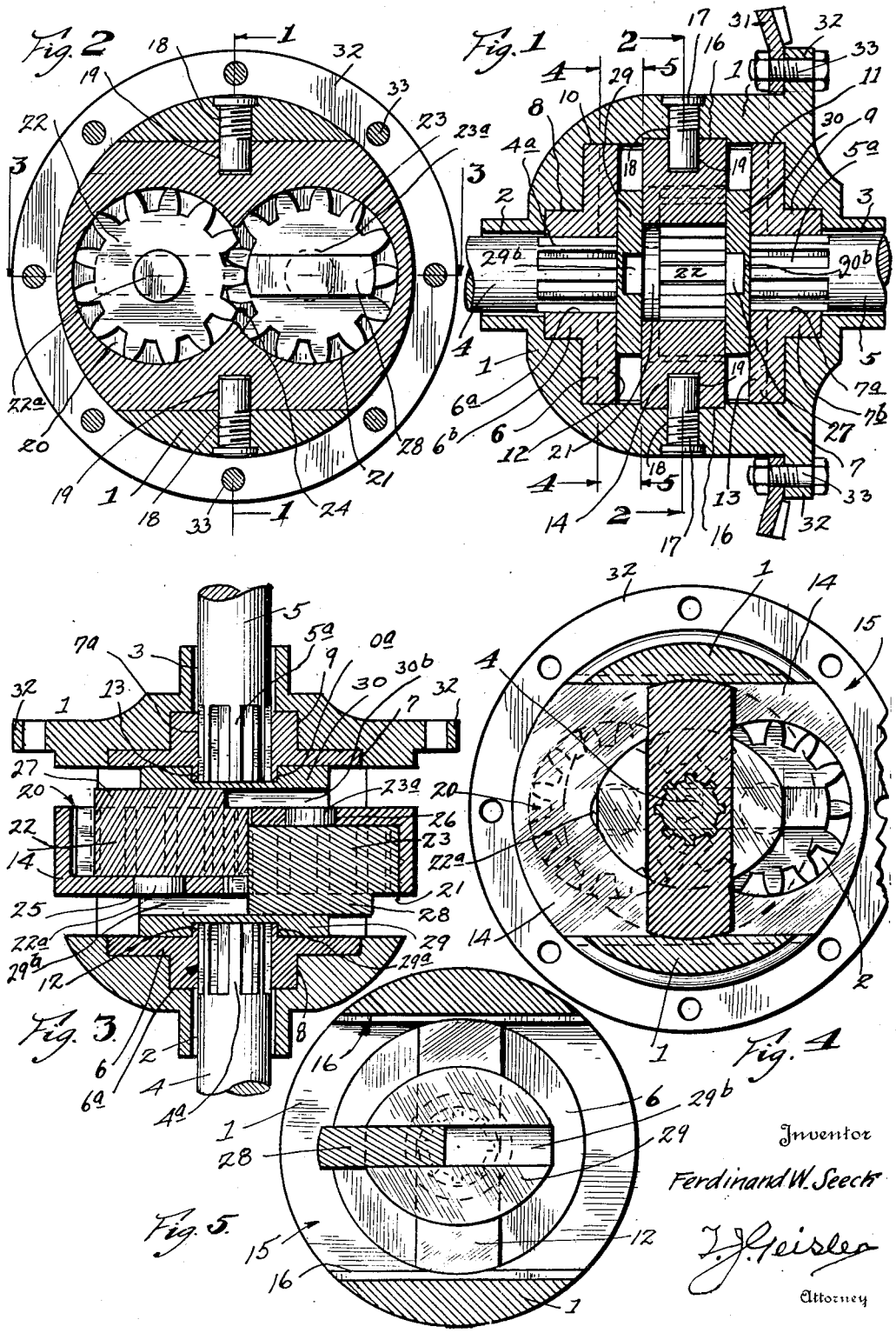

April 26, 1927.
F. W. SEECK
DIFFERENTIAL
Original Filed Sept. 18, 1923   3 Sheets-Sheet 2
1,626,120
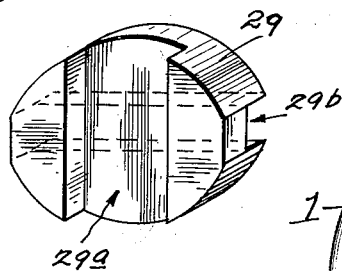
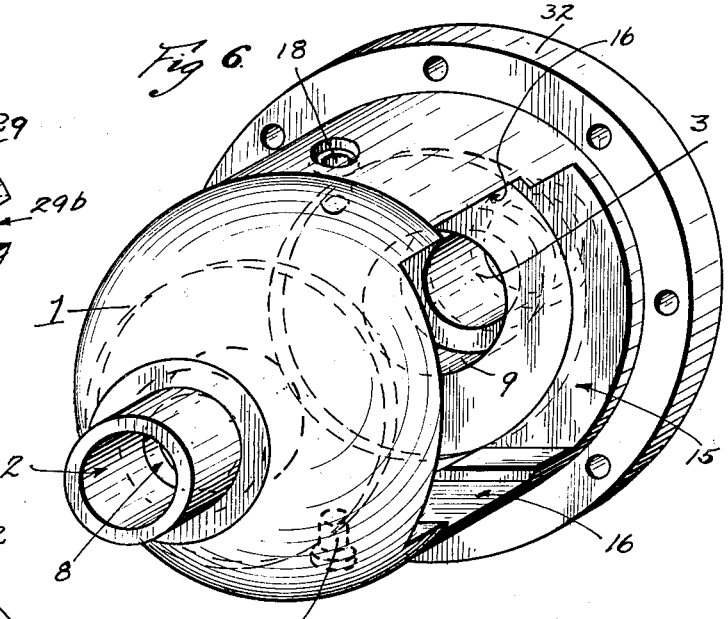
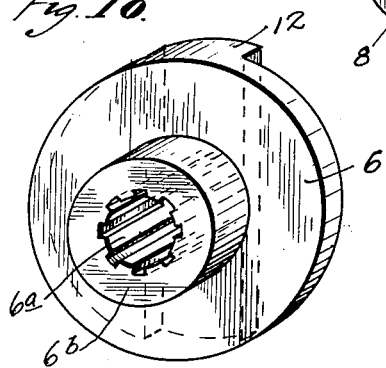
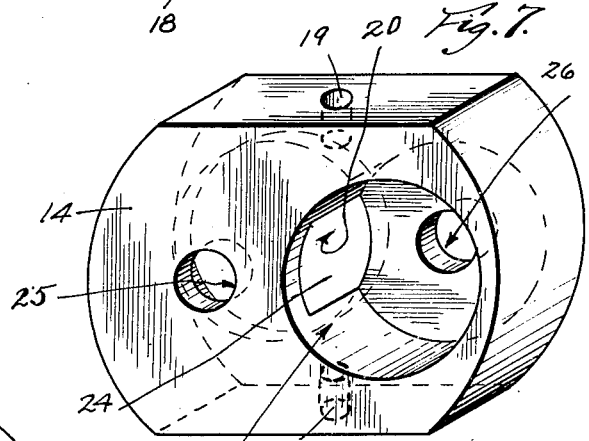
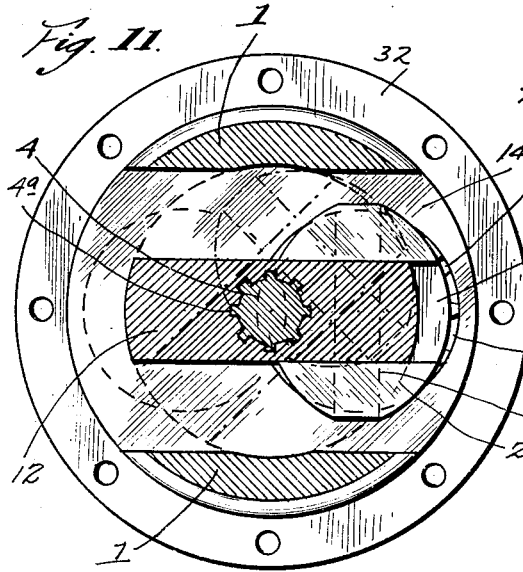
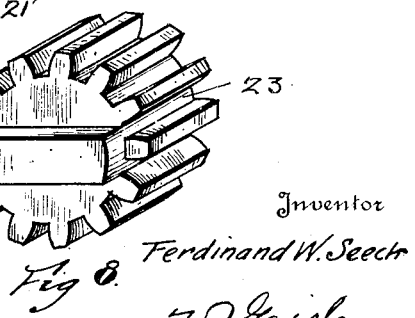
Inventor
Ferdinand W. Seeck
By F. J. Geisler
Attorney April 26, 1927. 1,626,120
F. W. SEECK
DIFFERENTIAL
Original Filed Sept. 18, 1923   3 Sheets-Sheet 3
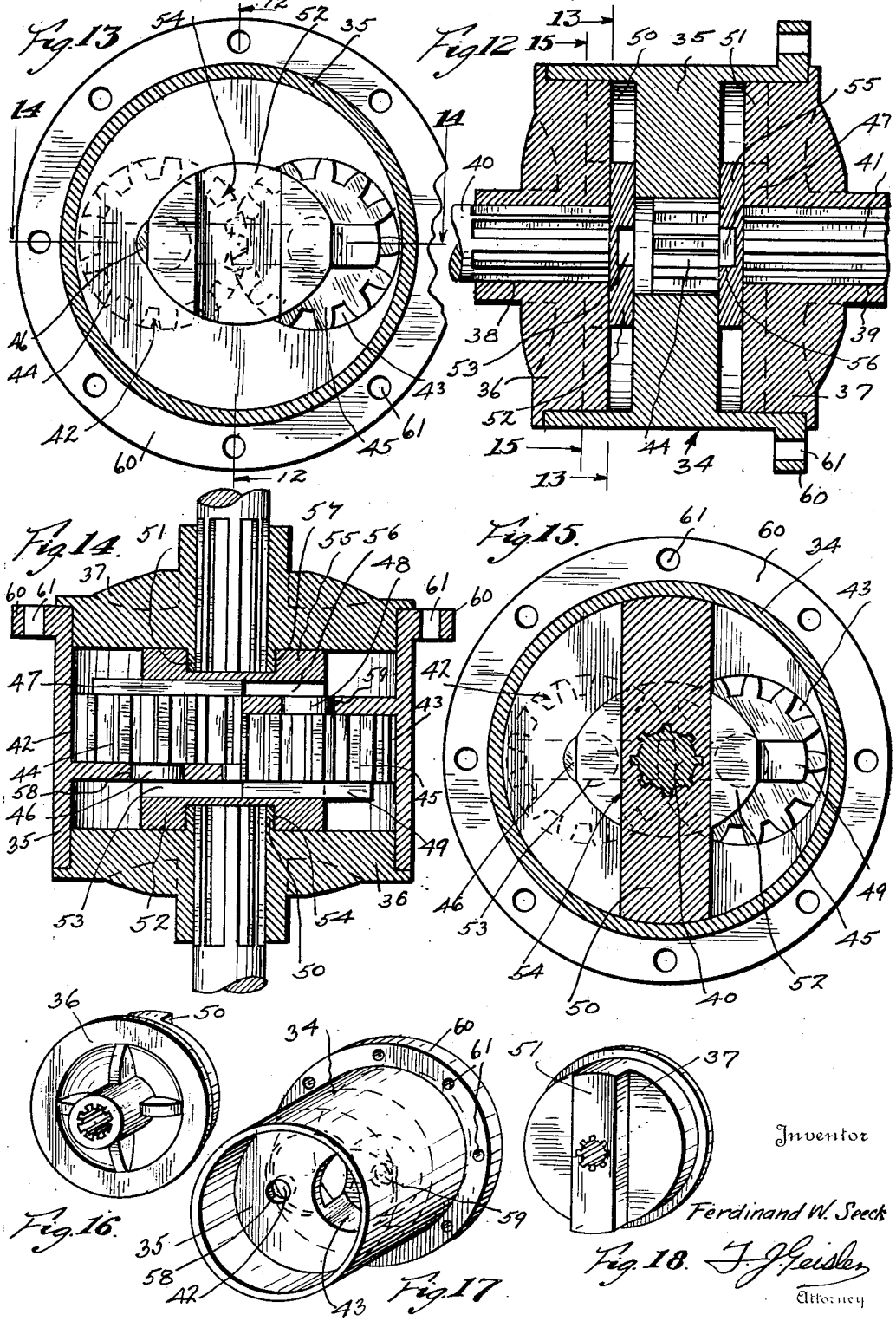

Patented Apr. 26, 1927.

1,626,120

UNITED STATES PATENT OFFICE.

FERDINAND W. SEECK, OF LEBANON, OREGON.

DIFFERENTIAL.

Application filed September 18, 1923, Serial No. 663,398. Renewed August 11, 1926.

The object of my invention is to provide a simple differential power transmitting mechanism adapted to drive the sections of the divided axle simultaneously at the same rate, and at the same time, permitting each of the axle sections to have a relatively different rate of rotation as required in driving around curves in the road.

A further object is to provide a differential which utilizes the frictional grip of one sliding member with another so that if one driving wheel tends to lose its frictional grip with the road surface it will be prevented from spinning.

A further object is to provide a differential which may be made very cheaply and which will operate efficiently and which conforms more closely to the standard type of gear differential now in common use than do the types of differentials, some of which have been described in Patent 1,278,231 dated September 10, 1918, Patent 1,355,170 dated October 12, 1920 and Patent 1,388,069 dated August 16th, 1921, all of these patents being granted to myself.

I attain these objects by providing a differential comprising a driven case, axle sections mounted in the opposite sides of the case, a disk mounted on each axle section, said disk being journaled in said case and thus providing a bearing for the inner ends of the axle sections, a transverse partition in said case, two gears journaled in said partition, meshing one with the other, said gears facing opposite sides of the case and being out of axial alinement with said axle sections, each being on opposite sides of the axis of said axle sections. I provide a sliding connecting member between each disk and one of said gears and provide a tongue on the opposed faces of said disks and the adjacent gear and provide said connecting member with grooves arranged normally to each other on its opposite faces, said grooves adapted to cooperate with said tongues whereby the axle sections are jointly driven but either section is permitted relative rotation with the other.

The construction and operation of my present invention is described in the accompanying specification having reference to the accompanying drawings, in which:

Fig. 1 is a longitudinal section through my differential taken on the line 1—1 of Fig. 2.

Fig. 2 is a cross section taken on the line 2—2 with Fig. 1.

Fig. 3 is a longitudinal section taken on the line 3—3 of Fig. 2.

Fig. 4 is a section taken on the line 4—4 of Fig. 1.

Fig. 5 is a section taken on the line 5—5 of Fig. 1.

Fig. 6 is a perspective view of the casing which encloses my differential mechanism;

Fig. 7 is a perspective view of the transverse partition for my mechanism and shows the recesses in which the gears are supported and in which they rotate;

Fig. 8 is a perspective view of one of these gears;

Fig. 9 is a perspective view of one of the sliding connecting blocks in the differential;

Fig. 10 is a perspective view of the disks which are mounted on the ends of each stub shaft;

Fig. 11 is a sectional view taken on the line 4—4 of Figure 1 and shows the position of the elements diagrammatically as they move from the position shown in Fig. 4 to the new position, the mechanism having rotated 90 degrees;

Fig. 12 is a longitudinal section through a slightly different construction embodying my invention and this longitudinal section is taken on the line 12—12 of Fig. 13;

Fig. 13 is a cross section taken on the line 13—13 of Fig. 12;

Fig. 14 is a longitudinal section taken on the line 14—14 of Fig. 13;

Fig. 15 is a cross section taken on the line 15—15 of Fig. 12;

Fig. 16 is a perspective view of one of the disks mounted on the end of each stub shaft;

Fig. 17 is a perspective view of the case of this differential; and

Fig. 18 is a perspective view of one of the sliding connecting blocks in this differential.

My improved differential mechanism, as shown in Figs. 1 to 11 inclusive, is housed in the integral casing 1 which has openings 2 and 3 through which the axle sections 4 and 5 may be inserted. On the end of each axle section I provide concentric disks as 6 and 7, the member 6 being mounted on axle sections 4 and being relatively connected thereto and the member 7 being mounted on the axle section 5. The ends of the axle sections 4 and 5 are splined as at $4^a$ and $5^b$ and the disks 6 and 7 are similarly grooved as at 6ª and 7ª, so as to receive the splined end. This construction permits the axle sections to be withdrawn from their disks but prevents relative rotation of these members one with the other. These disks are provided with concentric hubs 6ᵇ and 7ᵇ and these hubs are journaled in the sides of the casing as at 8 and 9. The periphery of these disks 6 and 7 are also journaled in the casing as at 10 and 11 and I provide a tongue on each of these members 6 and 7, which I number 12 and 13, the tongue 12 being on the inner face of the disk 6 and the tongue 13 on the inner face of the disk 7. I provide a removable partition 14, which may be slid into position in the casing through the open side 15 and is held against lateral movement therein by the groove 16. I place set screws 17 in the holes 18, the end of said screws extending through the casing into the holes 19 in the partition 14, so as to hold the partition against longitudinal movement in the groove 16. This transverse partition is provided with recesses 20 and 21, the recess 20 facing the disk 7 and the recess 21 facing the opposite side in which the disk is mounted. These recesses are cylindrical and are adapted to receive the differential gears 22 and 23. The recesses are diametrically the same as the point of the gears and thus when the gears are in place they are supported by their teeth in these recesses. These recesses overlie each other slightly and thus provide an opening 24 between them so that when the gears are in place they will mesh through this opening as shown in Fig. 2. I provide trunnions 22ª and 23ª, on these gears which bear respectively in the holes 25 and 26 in the transverse partition 14. These holes are smaller in diameter than the recess 20 and 21 but are concentric therewith. These holes, therefore, form an auxiliary bearing for the gears and tend to hold the gears in alinement. I provide tongues 27 and 28 on the face of the gears opposite to the one in which the trunnions are placed. The tongue 27 being provided on gear 22 and the tongue 28 on the gear 23. I provide sliding connecting blocks 29 and 30. The block 29 having grooves 29ª and 29ᵇ on its opposite faces arranged normal to each other and the connecting block 30 having similarly arranged grooves 30ª and 30ᵇ on its opposite faces. The groove 29ᵇ on the connecting block 29 fits over the tongue 28 on the gear 23 and the groove 29ª fits over the tongue 12 on the disk 6. The groove 30ᵇ fits over the tongue 27 on the gear 22 and the groove 30ª fits over the tongue 13, on the disk 7. It can thus be seen that all the differential mechanism is thus interlocked and the rotation of the casing must result in the rotation of the axle sections. The casing is provided with a differential ring gear 31, which is bolted to flange 32 on the casing by means of bolts 33.

In Figs. 12 to 18, inclusive, I have shown slightly different mechanism which incorporates my invention and which is enclosed in a slightly different type of casing. In these drawings the differential mechanism is enclosed in integral casing 34 which is open at each end and is provided with an integral transverse partition 35 intermediate the open ends. I provide disks 36 and 37 which constitute closure for these open ends and which are respectively provided with concentric openings 38 and 39 into which the axle sections 40 and 41 are mounted respectively. The transverse partition 35 is provided with recesses 42 and 43 which house the differential gears 44 and 45 respectively. These recesses and the gears housed therein, face in opposite directions, that is, towards opposite disks and opposite axle sections. The gear 44 is provided with a trunnion 46 on one side and a tongue 47 on the other, and the gear 45 is provided with a trunnion 48 on one side and a tongue 49 on its opposite side. The disk 36 is provided with a tongue 50 and the disk 37 is provided with a tongue 51. I provide a sliding connecting block 52 which has a groove 53 on one side which cooperates with the tongue 49 on the gear 45 and has a tongue 54 on its opposite side which is arranged normally to the grove 53 and this groove 54 cooperates with the tongue 50 on the disk 38. I provide a similar sliding block 55 on the opposite end of the differential mechanism which has a groove 56 on its inner face which cooperates with the tongue 47 of the gear 44 and which has a groove 57 arranged normally to the groove 56 which cooperates with the tongue 51 on the disk 37. The trunnion 46 is mounted and bears in the transverse partition 35 and the trunnion 48 is mounted in and bears similarly in the hole 55. These gears fit similarly to the gears 22 and 23 in the device as shown in Figs. 1 to 11, inclusive. The casing 34 is provided with a flange 60 to which a ring gear may be bolted and is provided with holes 61 in the flange through which fastening bolts may be placed.

The operation of both devices is exactly the same and thus I will describe them in general terms. As the automobile, provided with this differential mechanism, is driven around a curve in the road the outer wheels tend to rotate faster than the inner ones because they move in a longer arc and a differential movement results between the driving wheels which must be taken care of. Thus, for example, if the axle section 5 would tend to rotate faster than the axle section 4 in a clockwise direction as viewed in Figs. 1 and 2 the axle section 4 would tend to remain at rest relatively to the casing or would tend to rotate in a counterclockwise direction to accommodate the faster moving axle section 5.

If these axle sections thus tend to move at relatively different speeds or to rotate oppositely the sliding blocks 29 or 30 as viewed in Figs. 1 and 2, will tend to slide on the tongues 13 and 27 or 12 and 28. The grooves on the block being arranged normal to each other, permit this block to accommodate this relative rotation. In sliding, it will have to overcome a certain degree of resistance and thus this resistance is used to prevent the differential from rotating too freely. That is, the sliding action will set up a resistance which is easily overcome by the lever arm of the driving wheel, which is its radius, but the resistance is difficult or impossible to overcome by the lever of the opposite shaft, the length of which is its diameter.

By varying the degree which the gears are out of alinement with the shafts, this resistance can be adjusted and thus the differential mechanism may be built so that if one driving wheel has no frictional grip on the road it will be locked in position or else it may rotate slightly. If, for example it is desired to prevent the driving wheels from spinning in the least degree, the gears are placed only a great distance off center and are made relatively large and thus the frictional resistance of the sliding block on the tongues is increased and cannot be overcome by one gear tending to rotate in the direction opposite to the driven gear, so as to accomodate this movement. If, however, it is desired to permit the wheel to rotate slightly so that the differential will not move stiffly when the machine is driven around a curve in the road, the gears are placed closer to the center so as to provide a lesser resistance which will permit the gears to rotate relatively but will not permit them to rotate without restriction.

I claim:

1. In a differential mechanism, a driven case, a divided axle whose sections are journaled in opposite sides of the case, a disk mounted on each axle section, said case divided by a transverse partition, two gears journaled in said partition, meshing one with another, each gear being operatively connected with opposite axle sections through said disks whereby the axle sections are jointly driven by the rotation of the case, but either section is permitted relative rotation with the other.

2. In a differential mechanism, a driven case, axle sections mounted in opposite sides of the case, a disk mounted on the inner end of each axle section, said disks being journaled in said case to provide bearings for the inner ends of said axle sections, a transverse partition in said case, two gears journaled in said partition meshing one with the other, and facing opposite sides of the case, a connecting member between each disk and one of said gears, whereby the axle sections are jointly driven by the rotation of the case but either section is permitted relative rotation with the other.

3. In a differential mechanism, a driven case, axle sections mounted in opposite sides of the case, a disk mounted on the inner end of each axle section, said disks being journaled in said case to provide bearings for the inner ends of said axle sections, a transverse partition in said case, two gears journaled in said partition meshing one with the other, and facing opposite sides of the case, a sliding connecting member between each disk and one of said gears, whereby the axle sections are jointly driven by the rotation of the case but either section is permitted relative rotation with the other.

4. In a differential mechanism, a driven case, axle sections mounted in opposite sides of the case, a disk mounted on the inner end of each axle section, said disks being journaled in said case to provide bearings for the inner ends of said axle sections, a transverse partition in said case, two gears journaled in said partition meshing one with the other, and facing opposite sides of the case, a sliding connecting member between each disk and one of said gears, a tongue provided on the opposed faces of said disks and the adjacent gear, said connecting member being provided with grooves normal to each other on its opposite faces, said grooves adapted to cooperate with said tongues, whereby the axle sections are jointly driven by the rotation of the case but either section is permitted relative rotation with the other.

5. In a differential mechanism, a driven case, axle sections mounted in opposite sides of the case, a disk mounted on the inner end of each axle section, said disks being journaled in said case to provide bearings for the inner ends of said axle sections, a transverse partition in said case, two gears journaled in said partition meshing one with the other, and facing opposite sides of the case, a sliding connecting member between each disk and one of said gears, the opposed faces of said disks and the adjacent gears being connected by tongue and groove elements, whereby the axle sections are jointly driven by the rotation of the case but either section is permitted relative rotation with the other.

6. In a differential mechanism, a driven case, axle sections mounted in opposite sides of the case, a disk mounted on the inner end of each axle section, said disks being journaled in said case to provide bearings for the inner ends of said axle sections, a transverse partition in said case, two gears journaled in said partition meshing one with the other, and facing opposite sides of the case, said gears being out of axial alignment with said axle sections, and axis of rotation of each gear being offset from the axis of rotation of the axle sections and diametrically opposite each other, a sliding connecting member between each disk and one of said gears, the opposed faces of said disks and the adjacent gears being connected by tongue and groove elements, whereby the axle sections are jointly driven by the rotation of the case but either section is permitted relative rotation with the other.

FERDINAND W. SEECK.